United States Patent [19]

Meyer et al.

[11] Patent Number: 5,895,031
[45] Date of Patent: Apr. 20, 1999

[54] HYDRAULICALLY DAMPING ENGINE MOUNTING

[75] Inventors: Heinrich Meyer, Königswinter; Peter Maier, Grafschaft, both of Germany

[73] Assignee: Boge GmbH, Bonn, Germany

[21] Appl. No.: 08/690,188

[22] Filed: Jul. 26, 1996

[30] Foreign Application Priority Data

Jul. 26, 1995 [DE] Germany .......................... 195 27 260

[51] Int. Cl.$^6$ .............................. B60K 5/12; F16F 13/00
[52] U.S. Cl. ..................................... 267/140.12; 267/219
[58] Field of Search .......................... 267/140.12, 219, 267/140.11, 140.13, 220, 35, 122, 141.2; 180/291, 300, 902, 312; 248/562, 636, 638

[56] References Cited

U.S. PATENT DOCUMENTS 4,690,389  9/1987  West ................................ 267/140.12
5,044,813  9/1991  Gregg ............................... 267/140.12
5,286,011  2/1994  Strand .............................. 267/140.12

FOREIGN PATENT DOCUMENTS

0556704  8/1993  European Pat. Off. .

*Primary Examiner*—Douglas C. Butler
*Attorney, Agent, or Firm*—Nils H. Ljungman and Associates

[57] ABSTRACT

A hydraulically damping engine mounting for mounting a drive unit. Two fastening parts are connected to one another by way of an elastic element. A decoupling device is integrated with one of the fastening parts. The internal chamber formed by the fastening parts and the elastic element is divided into two chambers. The two chambers are connected to one another by a damping channel. The fastening parts and the elastic element which contains the chambers are located around a center axis which runs at right angles to the vertical axis of the drive unit.

11 Claims, 4 Drawing Sheets

HYDRAULICALLY DAMPING ENGINE MOUNTING

BACKGROUND OF THE INVENTION

1. Field of the Invention

The present invention relates generally to a hydraulically damping engine mounting for mounting a drive unit. The hydraulically damping engine mounting has two fastening parts which are connected to one another by means of an elastic element. An internal chamber formed by the fastening parts and the element is divided into two chambers which are connected to one another by means of a damping channel.

2. Background Information

A drive unit for a motor vehicle, as for example an internal combustion engine, can be a source of vibration that can be transmitted to the other parts of the vehicle. Drive unit vibration could include high-frequency vibrations or oscillations, possibly including drive unit vibration from unbalanced rotating members, combustion processes, and drive unit-drive line interactions. Drive unit vibration could also include sources of lower frequency vibrations or oscillations, possibly including pulses of motor torque and drive unit vibration from inertial forces generated by motion of the motor vehicle itself. It is therefore desirable to mount the drive unit to the remainder of the motor vehicle with engine mountings for damping or decoupling the vibration of the drive unit from the body of the motor vehicle to which the drive unit is mounted.

A known device (for example, European Laid Open Patent Application No. 556 704) discloses hydraulically damping engine mountings in which the chambers are located between two fastening parts and are connected to one another by means of a damping channel. At least one of the chambers has an elastic peripheral wall, which is then realized in the form of a pump chamber, whereby the second chamber is provided with bellows and forms the equalization chamber. Between the work chamber and the equalization chamber, a membrane plate is movably clamped to decouple, or isolate, high-frequency oscillations. Each of the fastening parts is provided with at least one fastening hole or fastening bolt which is used to fix the drive unit in position.

OBJECT OF THE INVENTION

The object of the present invention is to realize an engine mounting so that a simple construction of the components results in the ability to manufacture them economically, whereby a low dynamic spring rate can be achieved, along with a relatively high damping action.

SUMMARY OF THE INVENTION

The present invention teaches that this object can be accomplished by at least partly integrating the decoupling device into the fastening part.

In one embodiment, the electric element which contains the two chambers can be fixed in position with the fastening part. The chamber which is realized in the form of a pump chamber can thereby be advantageously connected to a decoupling device.

In a second embodiment, the second chamber can be realized in the form of an equalization chamber.

In an additional embodiment, in addition to the damping channel which connects the chambers, there can be a valve. In one advantageous embodiment, the valve can be realized so that it is pressure-controlled.

In an alternative embodiment, the valve can be an elastic lip which can be deflected in at least one direction.

To perform its function correctly both as an equalization chamber and as a decoupling device, the second chamber can have a bellows-like elastic wall.

In terms of suitable fabrication technologies, partly cylindrical geometries are appropriate as the outer wall of the outer fastening part. The outer wall can be provided with a flange to guarantee a corresponding fastening to the drive unit or to the vehicle.

In a still additional embodiment, the inner fastening part can be provided with a hole in which a fastening bolt can be located.

In yet an additional embodiment, limit stops can be provided between the fastening parts to limit travel. The present invention also teaches that the stops can be effective in two directions, axially and radially.

The present invention further teaches that the stops, in terms of their characteristic and functional clearances, can be realized so that they can be independent of the characteristic of the elastic element.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments are schematically illustrated in the accompanying drawings, wherein.

DESCRIPTION OF THE PREFERRED EMBODIMENT

Figure 1:
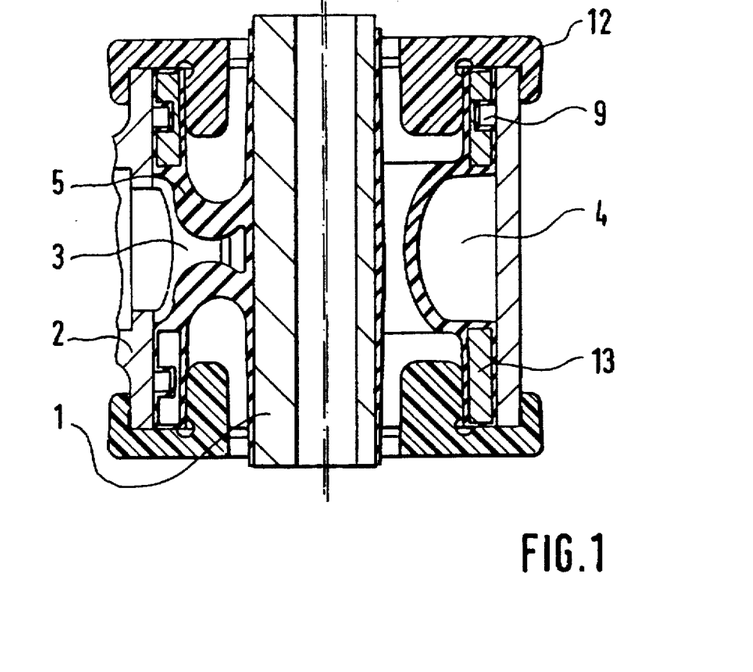
FIG. 1 is a longitudinal section through a hydraulically damping engine mounting.

The hydraulically damping engine mounting illustrated in FIG. 1 consists essentially of a first fastening part 1 and a second fastening part 2, as well as an elastic element 5 located between the first, or inner, fastening part 1 and the second, or outer, fastening part 2. Between the elastic element 5, the inner fastening part 1 and the outer fastening part 2, a first chamber 3 and a second chamber 4 can be formed. The chamber 3 thereby can preferably serve as a pump chamber 3, while the chamber 4 can be realized in the form of an equalization chamber 4. The two chamber, pump chamber 3 and equalization chamber 4, are connected to one another by means of a damping channel 9. Between inner fastening part 1 and outer fastening part 2 there are limit stops 12 for the axial and radial limitation of travel. Used as limit stops is elastic element 5 which can be buttoned or attached onto the outer fastening part 2.

The elastic element 5 can thereby preferably be vulcanized both to the inner fastening part 1 and, if necessary, also to the outer fastening part 2. The damping channel 9 can be located so that it runs in fixed, or rigid, ring-shaped elements 13.

In terms of fabrication technology, however, it can be more favorable if the elastic element 5 is vulcanized onto the inner fastening part 1, and is firmly but detachably mounted with respect to the outer fastening part 2, as is illustrated in FIG. 1. For this purpose, the elastic element 5 is vulcanized onto the ring elements 13, which in turn are firmly and tightly mounted on the inside diameter of the outer fastening part 2. Additional fastening elements can be the limit stops 12, which in this embodiment surround the inside circumference and outside circumference of outer fastening part 2, and the inside circumference and outside circumference portions of ring elements 13.

As illustrated in FIG. 1, the elastic element 5 is preferably vulcanized onto the ring-shaped elements 13. The ring-shaped elements 13 are located between portions of the limit stops 12 that are located along the inside circumference portion and outside circumference portion of each of the ring elements 13. In the embodiment shown in FIG. 1, the limit stops 12 are oriented generally concentrically about the inner fastening part 1, and are located near each end of both the inner fastening part 1 and the outer fastening part 2. The limit stops 12 can therefore limit both axial and radial travel of the inner fastening part 1 and outer fastening part 2 substantially independently of the elasticity or resiliency of elastic element 5. Also, the limit stops 12 can be made of a material whose damping characteristics or resiliency characteristics are independent of the elastic element 5.

Figure 2:
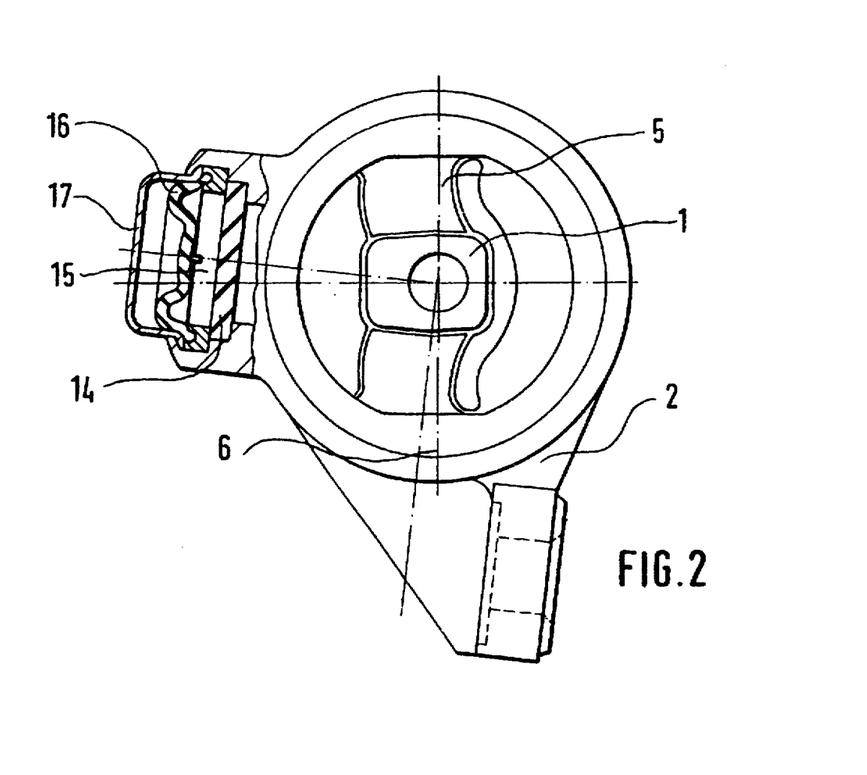
FIG. 2 is a cross section through the engine mounting illustrated in FIG. 1.

FIG. 2 shows a cross section of the hydraulically damping engine mounting illustrated in FIG. 1. In FIG. 2, the outer fastening part 2 is preferably provided with a flange 11 (see also FIG. 3) for fastening to the vehicle (not shown). The left half of FIG. 2 also shows a decoupling device 7 which is dynamically connected to the chamber 3. The elastic element 5 is located inside the outer fastening part 2, and is preferably vulcanized to the inner fastening part 1, thereby forming the chamber 3 and the chamber 4. When the engine mounting is in the installed position, therefore, the center axis 6 thereby runs approximately at right angles to the vertical axis of the drive unit (not shown).

The decoupling device 7 includes a membrane disc 14 which is mounted so that the membrane disc 14 is preferably axially movable. A space 15 is thereby filled with damping medium from chamber 3, since the damping medium can travel over the outside periphery of the membrane disc 14 into the chamber 15. The actual seal of the decoupling device 7 is preferably provided by means of a bellows 16, which in turn can be protected against damage by means of a rigid cap 17.

In operation, the hydraulically damping engine mounting contains damping fluid located in both the first, or pump chamber 3 and the second, or equalization, chamber 4. By hydraulically connecting the two fluid chambers (i.e., chamber 3 and chamber 4), the damping channel 9 acts to damp vibrations in a first frequency range of vibration. The decoupling device 7, preferably dynamically hydraulically connected to the pump chamber 3 as shown in FIG. 2, can damp vibrations in a second, preferably higher, frequency range of vibration encompassing the high-frequency drive unit vibrations. A substantial portion of the frequencies of the first frequency range can be less than the second frequency range. By providing the decoupling device 7, the hydraulically damping engine mounting can preferably be optimized to damp both high-frequency drive unit vibration frequencies and the lower vibration frequencies transmitted to the engine mounting by a drive unit.

Figure 3:
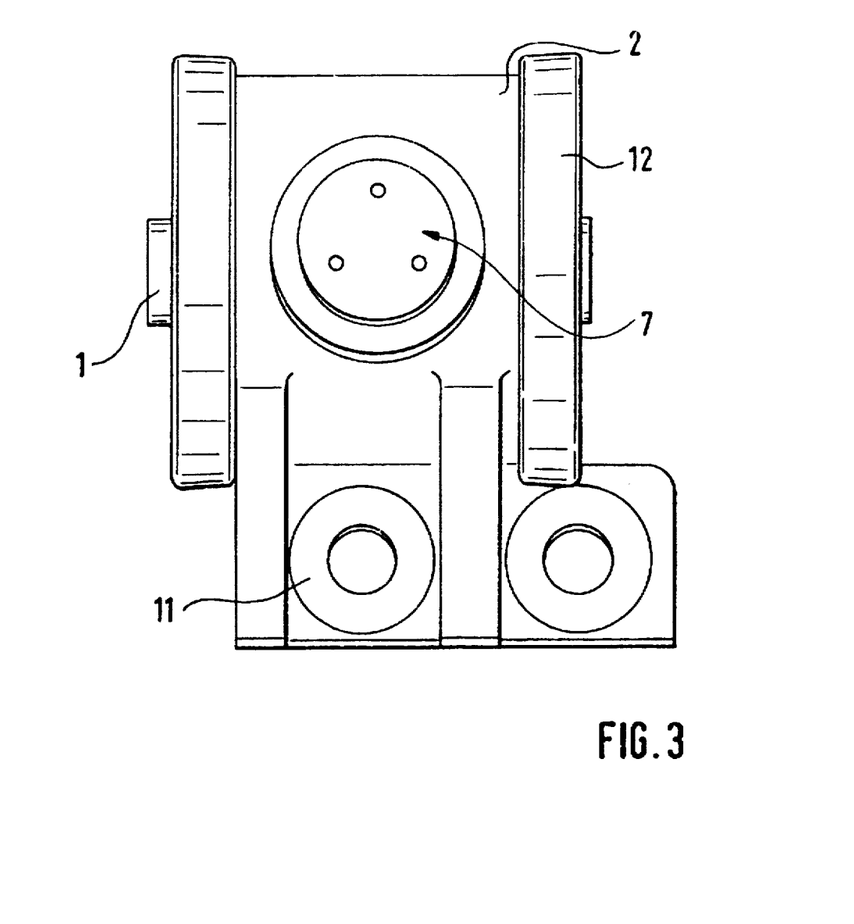
FIG. 3 is an overhead view of the engine mounting.

FIG. 3 is an overhead view which shows the decoupling device 7 located on the outer fastening part 2. FIG. 3 also shows, on the outer fastening part 2, the flange 11 with two holes for fastening to the motor vehicle (the motor vehicle not shown).

Figure 4:
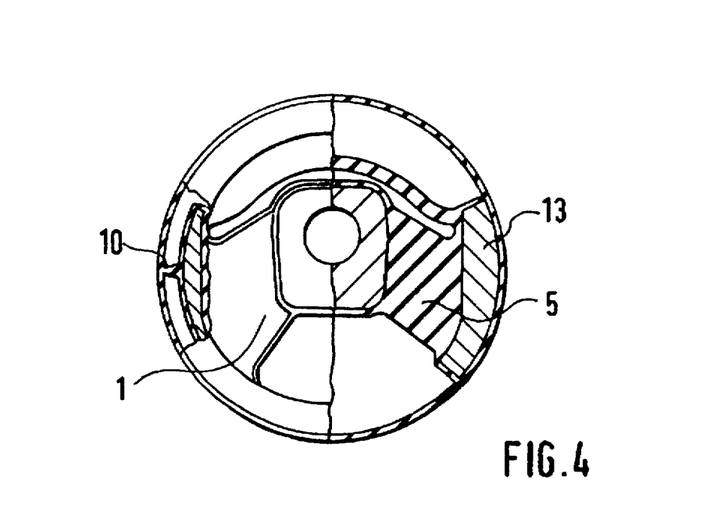
FIG. 4 is a cross-section in the vicinity of the valve.
Figure 5:
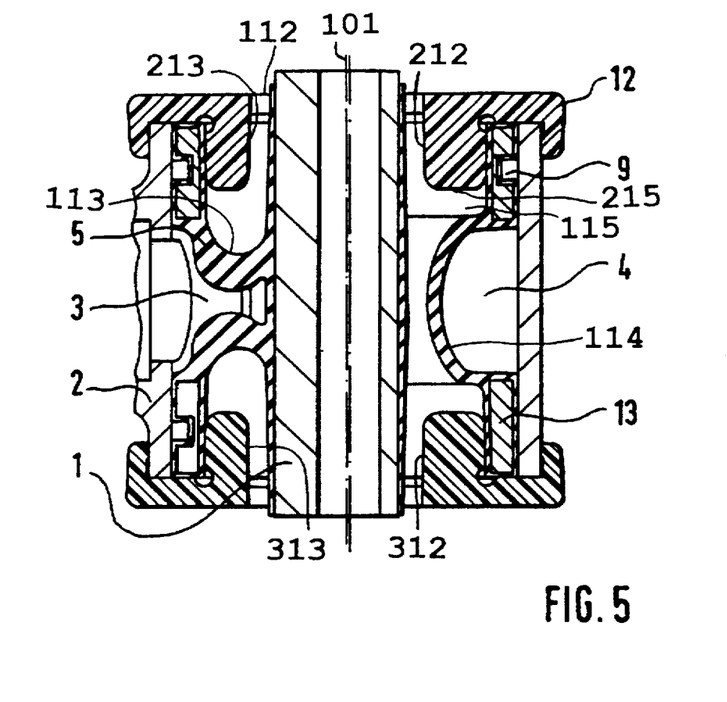
FIG. 5 is similar to FIG. 1, but includes additional reference numerals.
Figure 6:
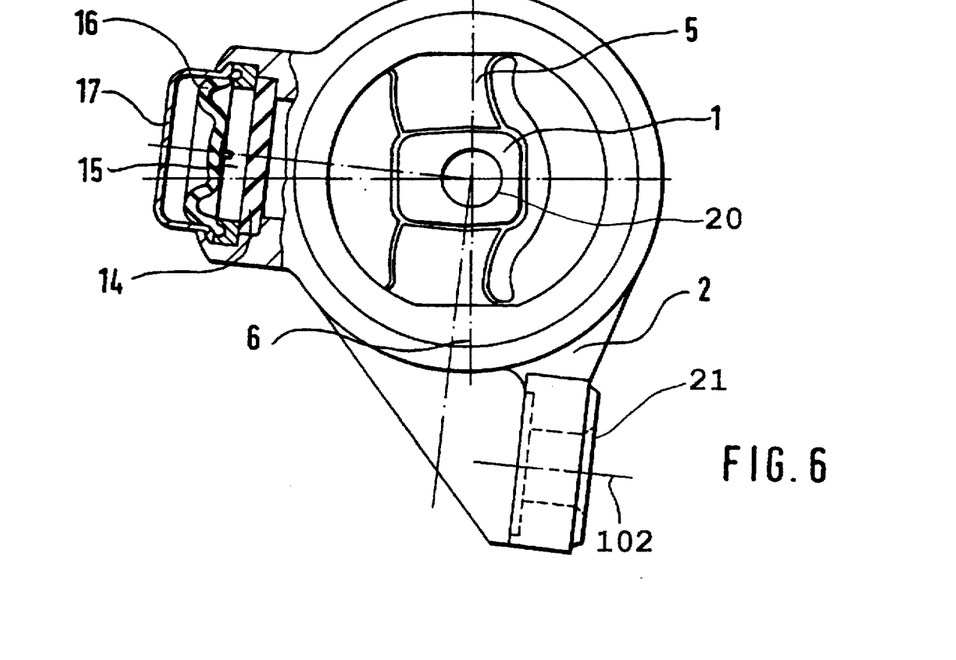
FIG. 6 is similar to FIG. 2, but includes additional reference numerals.
Figure 7:
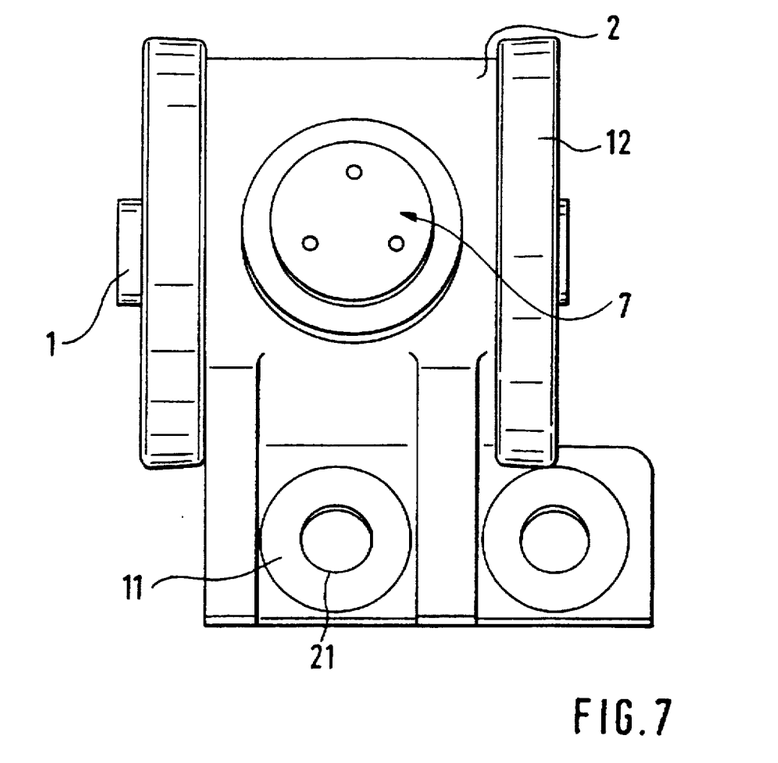
FIG. 7 is similar to FIG. 3, the includes an additional reference numeral.

FIG. 4 is a cross section in the vicinity of a valve 10. The valve 10, which can be flexible under pressure, substantially guarantees that a maximum pressure in the chamber 3 and/or the chamber 4 is not exceeded.

Figure 8:
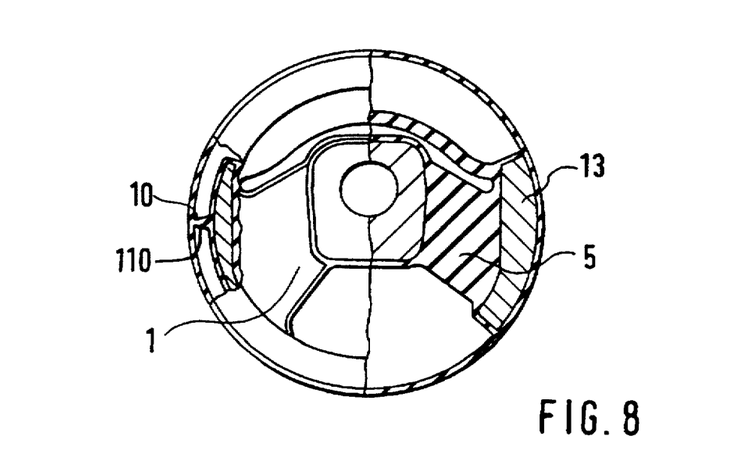
FIG. 8 is a cross-section in the vicinity of the valve, the valve being an alternative embodiment of that shown in FIG. 4.

In addition, the valve 10 can be disposed within the damping channel 9. The valve 10 can be disposed to relieve fluid pressure should a maximum fluid pressure be reached. The valve 10 therefore is preferably a pressure-controlled valve 10. However, in a different embodiment, the valve 10 can be an elastic lip 110 (see FIG. 8) which can be deflected in at least one direction for relieving fluid pressure.

As shown in the embodiment illustrated in FIGS. 1, 2, 5 and 6, the inner fastening part 1 has a fastener hole 20 (see FIG. 6) for attaching to a first portion of a motor vehicle, and the flange 11 of the outer fastening part has bolt holes 21 (see FIG. 6) for fastening to a second portion of a motor vehicle (not shown). The fastening axis 101 (see FIG. 5) of the outer fastening part 1 is essentially perpendicular to, and not parallel with, the fastening axis 102 (see FIG. 6) of the outer fastening part 2. It should be recognized by those skilled in the art that orientation of the fastening axis 102 can be modified in other embodiments to fit particular requirements.

As shown in FIG. 1, the inner fastening part 1 is elastically or resiliently connected to the outer fastening part 2 by the elastic element 5. Thus in operation, the inner fastening part 1 can be dynamically displaced with respect to fastening part 2 by vibrations transmitted to either fastening part 1 and/or fastening part 2. To limit the relative displacement of fastening part 1 and fastening part 2, limit stops 12 are provided. Taking the fastening axis 101 as defining an axial axis, relative radial displacement of fastening part 1 can be limited by the clearance 112 (see FIG. 5) of the fastening part 1 with the limit stops 12. The limit stops 12 can be made of a material difference than the elastic element 5 for weight savings or for other advantageous material characteristics.

Relative axial displacement of fastening part 1 and fastening part 2 can also be limited by the limit stops 12. Relative axial displacement of the fastening part 1 also causes relative axial displacement of a portion of the elastic element 5. Initially, the wall 114 (see FIG. 5) of the equalization chamber 4 is separated by an axial clearance 115 (see FIG. 5) from the corresponding limit stop 12. Continued axial displacement of the fastening part 1 will, for the embodiment shown in FIG. 1, bring the wall portion 114 of the equalization chamber 4 to contact a projecting axial portion 212 and its corresponding end surface 215 (see FIG. 5) of the limit stop 12 and thereby limit relative axial displacement of fastening part 1.

In accordance with one embodiment, a wall 113 (see FIG. 5) of the pump chamber 5 could also contact an axial portion 213 of the limit stop 12 in cooperation with wall 114 of the equalization chamber 4 to limit relative axial displacement of fastening part 1, and each limit stop 12 shown in FIG. 1 can be disposed to limit axial displacement of fastening part 1 in an opposite direction of motion.

The axial length of the axial portion 212 and axial portion 213 of the limit stops 12 can be varied to vary the maximum relative axial displacement of the fastening part 1 for specific mounting requirements. The axial lengths of the axial portion 312 and axial portion 313 of the other, or lower, limit stop 12 shown in FIG. 5 could also be different than the axial lengths of the axial portion 212 and axial portion 213 of the upper limit stop 12, to limit axial displacement of the first fastening part 1 in one axial direction to a different maximum value than a maximum value in the opposite axial direction.

If an embodiment of the present invention were made without the limit stops 12, the relative displacements of the first fastening part 1 and the second fastening part 2 could be limited by the elasticity or resiliency of the elastic element 5. Therefore desired maximum relative displacement of the fastening part 1 could be an important selection criteria in selecting a material for the elastic element 5. However, an embodiment with limit stops 12 (as for example as shown in FIG. 1) allows the limits of relative displacement of the fastening part 1 to be essentially defined by the shape of the limit stops 12 (as for example, by limit stop portions 212, 213, 312 and 313, and limit stop clearance 112). Therefore the elasticity or resiliency of the material making up elastic element 5 can be selected substantially independently of the desired limits of relative travel between fastening part 1 and fastening part 2. Further, variations in travel limits can be provided for among different types of motor vehicles by simply changing the configuration of the limit stops 12 for the same elastic element 5.

One feature of the invention resides broadly in the hydraulically damping engine mounting for mounting a drive unit, with two fastening parts, the inner fastening part 1 and the outer fastening part 2, which are connected to one another by means of an elastic element 5, whereby the internal chamber formed by the fastening parts, i.e. inner fastening part 1 and outer fastening part 2, and the elastic element 5 is divided into two chambers, the first chamber 3 and the second chamber 4, which two chambers (first chamber 3 and second chamber 4) are connected to one another by means of a damping channel 9, characterized by the fact that the decoupling device 7 is at least partly integrated into the fastening part 2.

Another feature of the invention resides broadly in the engine mounting characterized by the fact that the elastic element 5 containing chamber 3 and chamber 4 is fixed in position with the fastening part 2.

Yet another feature of the invention resides broadly in the engine mounting characterized by the fact that the chamber 3 realized in the form of a pump chamber is in communication with a decoupling device 7.

Still another feature of the invention resides broadly in the engine mounting characterized by the fact that the second chamber 4 is realized in the form of an equalization chamber.

A further feature of the invention resides broadly in the engine mounting characterized by the fact that, in addition to the damping channel 9 connecting chamber 3 and chamber 4, there is a valve 10.

Another feature of the invention resides broadly in the engine mounting characterized by the fact that the valve 10 is realized so that it is pressure-controlled.

Yet another feature of the invention resides broadly in the engine mounting characterized by the fact that at the valve 10, an elastic lip can be provided which can be deflected in at least one direction.

Still another feature of the invention resides broadly in the engine mounting characterized by the fact that the second chamber 4 has a bellows-like elastic wall.

A further feature of the invention resides broadly in the engine mounting characterized by the fact that the outer wall of the outer fastening part 2 is partly cylindrical.

Another feature of the invention resides broadly in the engine mounting characterized by the fact that the outer wall of fastening part 2 has a flange 11 which is used for fastening.

Yet another feature of the invention resides broadly in the engine mounting characterized by the fact that the inner fastening part 1 is provided with a hole for the location of a fastening bolt.

Still another feature of the invention resides broadly in the engine mounting characterized by the fact that between fastening part 1 and fastening part 2 there are limit stops 12 to limit travel.

A further feature of the invention resides broadly in the engine mounting characterized by the fact that the limit stops 12 are effective in two directions, axially and radially.

Another feature of the invention resides broadly in the engine mounting characterized by the fact that the limit stops 12 can be realized in their characteristic and functional clearances (i.e., the travel of fastening part 1 and fastening part 2) independently of the characteristic of the elastic element 5.

A yet additional feature of the invention resides broadly in the engine mounting characterized by the fact that the limit stops 12 can limit the radial and axial displacement of the fastening part 1 and the fastening part 2 substantially independently of the elasticity of resiliency of the elastic element 5.

An additional further feature of the invention resides broadly in that the limit stops 12 can selectively limit relative axial displacement of the fastening part 1 and the fastening part 2 independently in each direction of axial travel.

Examples of hydraulically damping engine mountings which could possibly be adapted for use in the present invention, along with additional components generally associated with hydraulically damping engine mountings which might be interchangeable with, or adaptable as, components of the embodiments as described hereinabove, might be disclosed by the following U.S. Patents, each of which were assigned to Boge A. G., the predecessor of the assignee of the present invention: U.S. Pat. No. 5,386,973, U.S. Pat. No. 5,340,094, U.S. Pat. No. 5,263,815 and U.S. Pat. No. 5,181,698.

Additional examples of hydraulically damping engine mountings which could possibly be adapted for use in the present invention, along with additional components generally associated with hydraulically damping engine mountings which might be interchangeable with, or adaptable as, components of the embodiments as described hereinabove, might be disclosed by the following U.S. Patents: U.S. Pat. No. 5,464,196, U.S. Pat. No. 5,431,377, U.S. Pat. No. 5,388,812, U.S. Pat. No. 5,273,262 and U.S. Pat. No. 5,205,546.

Examples of antivibration mountings incorporating limit stops which could possibly be adapted for use in the present invention, along with additional components generally associated with antivibration mountings which might be interchangeable with, or adaptable as, components of the embodiments as described hereinabove, might be disclosed by the following U.S. Patents: U.S. Pat. No. 5,288,059 and U.S. Pat. No. 5,834,350.

Examples of vulcanization and similar processes that could be applied to the present invention might be disclosed by the following U.S. Patents: U.S. Pat. No. 5,034,852, U.S. Pat. No. 4,943,070, U.S. Pat. No. 4,819,953, U.S. Pat. No. 4,746,130 and U.S. Pat. No. 4,075,755.

Although only a few exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function, and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damping engine mounting for a motor vehicle, said engine mounting comprising:

a first fastening part;

said first fastening part comprising means for connecting to a first part of the motor vehicle;

a second fastening part;

said second fastening part comprising means for connecting to a second part of the motor vehicle;

a first fluid chamber;

a second fluid chamber;

an elastic element;

said elastic element being disposed to form at least a portion of said first fluid chamber;

said elastic element being disposed to form at least a portion of said second fluid chamber;

said elastic element comprising means for connecting said first fastening part to said second fastening part;

means for hydraulically connecting said first fluid chamber and said second fluid chamber;

said hydraulic connecting means comprising a damping channel for damping vibrations in a first frequency range;

a decoupling device;

said decoupling device comprising means for damping vibrations in a second frequency range;

the second frequency range of vibration comprising the high-frequency vibrations transmitted to said mounting by operation of a motor of the motor vehicle;

at least a substantial portion of the first frequency range comprising frequencies less than the second frequency range;

said decoupling device comprising a portion of said second fastening part;

said elastic element being fixedly connected to said second fastening part;

said first fluid chamber being configured to be a pump chamber;

said pump chamber being disposed to be in dynamic hydraulic connection with said decoupling device;

said second fluid chamber being configured to be an equalization chamber;

said equalization chamber comprising a bellows wall;

said bellows wall comprising an elasticity;

said means for hydraulically connecting said first fluid chamber and said second fluid chamber comprising valve means;

said valve means comprising means for regulating a maximum hydraulic pressure;

said valve means comprising one of: a pressure-controlled valve and elastic lip means;

said elastic lip means comprising an elastic lip; and said elastic lip being flexible in at least one direction of flexure; and said elastic lip flexibility comprising means for regulating a maximum hydraulic pressure.

2. The engine mounting according to claim 1, wherein:

said first fastening part comprises a first fastener axis;

the first fastener axis defines an axial axis;

the axial axis is disposed generally parallel with the first fastener axis;

the first fastener axis defines a radial direction;

the radial direction is generally perpendicular to the first fastener axis;

stop means;

said stop means for limiting relative displacement of said first fastening part with respect to said second fastening part substantially independently of the elasticity of said elastic element;

said stop means comprises means for limiting displacement of said first fastening part with respect to said second fastening part in the axial direction;

said stop means comprises means for limiting displacement of said first fastening part with respect to said second fastening part in the radial direction;

said stop means comprises at least one limit stop;

said at least one limit stop is disposed to limit axial displacement of said first fastening part with respect to said second fastening part;

said at least one limit stop is disposed to limit radial displacement of said first fastening part with respect to said second fastening part;

said second fastening part comprises a cylindrical portion;

said second fastening part comprises a flange; and said flange comprises means for fastening said second fastening part to the second part of the motor vehicle.

3. The engine mounting according to claim 2, wherein:

said first fastening part is a tubular member disposed about the first fastener axis;

said cylindrical portion of said second fastening part is disposed about said first fastening part;

said elastic element is disposed between said first fastening part and said second fastening part;

said at least one limit stop is a first limit stop;

said at least one limit stop comprises a second limit stop;

said elastic element is connected to each of: said first limit stop and said second limit stop;

each of: said first limit stop and said second limit stop is disposed generally concentrically about the first fastener axis;

said second fastening part is disposed between said first limit stop and said second limit stop;

said stop means for limiting radial displacement of said first fastening part with respect to said second fastening part comprises:

each of: said first limit stop and said second limit stop comprises a bore;

an end portion of said first fastening part is disposed within said bore of said first limit stop;

an opposite end portion of said first fastening part is disposed within said bore of said second limit stop;

each of said end portions of said first fastening part is disposed with radial clearance within each of said bores of said first limit stop and said second limit stop; and each end of said first fastening part is disposed to contact said corresponding first limit stop and said second limit stop upon a predetermined maximum radial displacement of said first fastening part with respect to said second fastening part;

said stop means for limiting axial displacement of said first fastening part with respect to said second fastening part comprises:

each of: said first limit stop and said second limit stop comprises a tubular portion;

each of said tubular portions is disposed between said bore and said second fastening part;

each of said tubular portions comprises a length;

the length of each of said tubular portions is disposed to extend in the axial direction;

each of said tubular portions comprises an end surface;

said end surface of said first limit stop being disposed opposite said end surface of said second limit stop;

each of said first limit stop end surface and said second limit stop end surface is disposed with axial clearance from a portion of said elastic element; and each of said first limit stop end surface and said second limit stop end surface is disposed to contact said corresponding elastic element portion upon a predetermined maximum relative axial displacement of said first fastening part in a corresponding axial direction of displacement;

said engine mounting further comprises a plurality of ring elements;

each of said plurality of ring elements is mounted adjacent an inner diameter of said second fastening part cylindrical portion;

at least one of said plurality of ring elements is detachably mounted to said second fastening part;

said elastic element is connected to said at least one detachably mounted ring element for detachably connecting said elastic element to said second fastening part;

said damping channel is disposed within at least one of said plurality of ring elements;

said valve means is disposed within said damping channel;

a portion of said elastic element forms said bellows wall of said equalization chamber;

said second fastening part cylindrical portion comprises said second fastening part flange portion;

said second fastening part flange portion comprises at least one fastening hole;

said at least one fastening hole of said second fastening part is disposed concentrically about a second fastener axis;

the second fastener axis is disposed generally perpendicular to the first fastener axis; and said decoupling device comprises:
 a third fluid chamber;
 a portion of said first fastening component is disposed about a portion of said third fluid chamber;
 a membrane disc;
 said membrane disc is disposed between said third fluid chamber and said pump chamber;
 said membrane disc is movably for fluid connection between said third fluid chamber and said pump chamber;
 sealing means;
 said sealing means comprises a bellows;
 said bellows comprises a portion of said third fluid chamber;
 means for protecting said sealing means; and
 said protection means comprises a rigid cap.

4. A hydraulically damping engine mounting for a motor vehicle, said engine mounting comprising:

a first fastening part;

said first fastening part comprising apparatus to connect to a first part of the motor vehicle;

a second fastening part;

said second fastening part comprising apparatus to connect to a second part of the motor vehicle;

a first fluid chamber;

a second fluid chamber;

an elastic element;

said elastic element being disposed to form at least a portion of said first fluid chamber;

said elastic element being disposed to form at least a portion of said second fluid chamber;

said elastic element comprising structure to connect said first fastening part to said second fastening part;

an arrangement to hydraulically connect said first fluid chamber and said second fluid chamber;

said arrangement to hydraulically connect comprising a damping channel for damping vibrations in a first frequency range;

a decoupling device;

said decoupling device comprising a portion of said second fastening part;

said decoupling device comprising apparatus for damping vibrations in a second frequency range;

the second frequency range of vibration comprising the high-frequency vibrations transmitted to said mounting by operation of a motor of the motor vehicle;

at least a substantial portion of the first frequency range comprising frequencies less than the second frequency range;

said elastic element being fixedly connected to said second fastening part;

said first fluid chamber being configured to be a pump chamber;

said pump chamber being disposed to be in dynamic hydraulic connection with said decoupling device;

said second fluid chamber being configured to be an equalization chamber;

said equalization chamber comprising a bellows wall;

said bellows wall comprising a resiliency;

said arrangement to hydraulically connect said first fluid chamber and said second fluid chamber comprising a valve device;

said valve device comprising structure to regulate a maximum hydraulic pressure;

said valve device comprising one of: a pressure-controlled valve and an elastic lip;

said elastic lip being flexible in at least one direction of flexure; and said elastic lip flexibility regulating a maximum hydraulic pressure.

5. The engine mounting according to claim 4, wherein:

said first fastening part comprises a first fastener axis;

the first fastener axis defines an axial axis;

the axial axis is disposed generally parallel with the first fastener axis;

the first fastener axis defines a radial direction;

the radial direction is generally perpendicular to the first fastener axis;

at least one stop;

said at least one stop to limit relative displacement of said first fastening part with respect to said second fastening part substantially independently of the elasticity of said elastic element;

said at least one stop comprises structure to limit displacement of said first fastening part with respect to said second fastening part in the axial direction;

said at least one stop comprises structure to limit displacement of said first fastening part with respect to said second fastening part in the radial direction;

said at least one stop comprises at least one limit stop;

said at least one limit stop is disposed to limit axial displacement of said first fastening part with respect to said second fastening part; and said at least one limit stop is disposed to limit radial displacement of said first fastening part with respect to said second fastening part.

6. The engine mounting according to claim 5, wherein:

said second fastening part comprises a cylindrical portion;

said second fastening part comprises a flange portion; and said flange portion comprises structure to fasten said second fastening part to the second part of the motor vehicle.

7. The engine mounting according to claim 6, wherein:

said first fastening part is a tubular member disposed about the first fastener axis;

said cylindrical portion of said second fastening part is disposed about said first fastening part;

said elastic element is disposed between said first fastening part and said second fastening part;

said at least one limit stop is a first limit stop;

said at least one limit stop comprises a second limit stop;

said elastic element is connected to each of: said first limit stop and said second limit stop;

each of: said first limit stop and said second limit stop is disposed generally concentrically about the first fastener axis;

said second fastening part is disposed between said first limit stop and said second limit stop;

said structure for limiting radial displacement of said first fastening part with respect to said second fastening part comprises:

each of: said first limit stop and said second limit stop comprises a hole;

an end portion of said first fastening part is disposed within said hole of said first limit stop;

an opposite end portion of said first fastening part is disposed within said hole of said second limit stop;

each of said end portions of said first fastening part is disposed with radial clearance within each of said holes of said first limit stop and said second limit stop; and each end of said first fastening part is disposed to contact said corresponding first limit stop and said second limit stop upon a predetermined maximum radial displacement of said first fastening part with respect to said second fastening part;

said structure for limiting axial displacement of said first fastening part with respect to said second fastening part comprises:

each of: said first limit stop and said second limit stop comprises a tubular portion;

each of said tubular portions is disposed between said bore and said second fastening part;

each of said tubular portions comprises a length;

the length of each of said tubular portions is disposed to extend in the axial direction;

each of said tubular portions comprises an end surface;

said end surface of said first limit stop being disposed opposite said end surface of said second limit stop;

each of said first limit stop end surface and said second limit stop end surface is disposed with axial clearance from a portion of said elastic element; and each of said first limit stop end surface and said second limit stop end surface is disposed to contact said corresponding elastic element portion upon a predetermined maximum relative axial displacement of said first fastening part in a corresponding axial direction of displacement;

said engine mounting further comprises a plurality of ring elements;

each of said plurality of ring elements is mounted adjacent an inner diameter of said second fastening part cylindrical portion;

at least one of said plurality of ring elements is detachably mounted to said second fastening part;

said elastic element is connected to said at least one detachably mounted ring element for detachably connecting said elastic element to said second fastening part;

said damping channel is disposed within at least one of said plurality of ring elements;

said valve device is disposed within said damping channel;

a portion of said elastic element forms said bellows wall of said equalization chamber;

said second fastening part cylindrical portion comprises said second fastening part flange portion;

said second fastening part flange portion comprises at least one fastening hole;

said at least one fastening hole of said second fastening part is disposed concentrically about a second fastener axis;

the second fastener axis is disposed generally perpendicular to the first fastener axis; and said decoupling device comprises:

a third fluid chamber;

a portion of said first fastening component is disposed about a portion of said third fluid chamber;

a membrane disc;

said membrane disc is disposed between said third fluid chamber and said pump chamber;

said membrane disc is movable for fluid connection between said third fluid chamber and said pump chamber;

sealing means;

said sealing means comprises a bellows;

said bellows comprises a portion of said third fluid chamber;

means for protecting said sealing means; and said protection means comprises a rigid cap.

8. A hydraulically damping engine mounting for a motor vehicle, said engine mounting comprising:

a first fastening part;

said first fastening part comprising apparatus to connect to a first part of the motor vehicle;

a second fastening part;

said second fastening part comprising apparatus to connect to a second part of the motor vehicle;

a first fluid chamber;

a second fluid chamber;

structure to hydraulically connect said first fluid chamber and said second fluid chamber;

said hydraulic connecting structure comprising a damping channel;

a decoupling device;

said decoupling device comprising a portion of said second fastening part;

said engine mounting comprising an arrangement to dampen vibrations in a first frequency range;

said decoupling device comprising apparatus to dampen vibrations in a second frequency range;

the second frequency range of vibration comprising the high-frequency vibrations transmitted to said mounting by operation of a motor of the motor vehicle; and a substantial portion of said first frequency range comprising frequencies less than the second frequency range;

a resilient element;

said resilient element being disposed to form at least a portion of said first fluid chamber;

said resilient element being disposed to form at least a portion of said second fluid chamber;

said resilient element comprising structure for connecting said first fastening part to said second fastening part;

said resilient element being fixedly connected to said second fastening part;

said first fluid chamber being configured to be a pump chamber;

said pump chamber being disposed to be in dynamic hydraulic connection with said decoupling device;

said second fluid chamber being configured to be an equalization chamber;

said equalization chamber comprising a bellows wall;

said bellows wall comprises an elasticity;

said structure to hydraulically connect said first fluid chamber and said second fluid chamber comprising a valve device;

said valve device comprising structure for regulating a maximum hydraulic pressure;

said valve means comprising one of: a pressure-controlled valve and an elastic lip;

said elastic lip being flexible in at least one direction of flexure; and said elastic lip flexibility being configured to regulate a maximum hydraulic pressure.

9. The engine mounting according to claim 8, wherein:

said first fastening part comprises a first fastener axis;

the first fastener axis defines an axial axis;

the axial axis is disposed generally parallel with the first fastener axis;

the first fastener axis defines a radial direction;

the radial direction is generally perpendicular to the first fastener axis;

at least one stop;

said at least one stop for limiting relative displacement of said first fastening part with respect to said second fastening part substantially independently of the elasticity of said elastic element;

said at least one stop comprises means for limiting displacement of said first fastening part with respect to said second fastening part in the axial direction;

said at least one stop comprises means for limiting displacement of said first fastening part with respect to said second fastening part in the radial direction;

said at least one stop comprises at least one limit stop;

said at least one limit stop is disposed to limit axial displacement of said first fastening part with respect to said second fastening part; and said at least one limit stop is disposed to limit radial displacement of said first fastening part with respect to said second fastening part.

10. The engine mounting according to claim 9, wherein:

said second fastening part comprises a cylindrical portion;

said second fastening part comprises a flange; and said flange comprises apparatus to fasten said second fastening part to the second part of the motor vehicle.

11. The engine mounting according to claim 10, wherein:

said first fastening part is a tubular member disposed about the first fastener axis;

said cylindrical portion of said second fastening part is disposed about said first fastening part;

said resilient element is disposed between said first fastening part and said second fastening part;

said at least one limit stop is a first limit stop;

said at least one limit stop comprises a second limit stop;

said resilient element is connected to each of: said first limit stop and said second limit stop;

each of: said first limit stop and said second limit stop is disposed generally concentrically about the first fastener axis;

said second fastening part is disposed between said first limit stop and said second limit stop;

said stop means for limiting radial displacement of said first fastening part with respect to said second fastening part comprises:

each of: said first limit stop and said second limit stop comprises a bore;

an end portion of said first fastening part is disposed within said bore of said first limit stop;

an opposite end portion of said first fastening part is disposed within said bore of said second limit stop;

each of said end portions of said first fastening part is disposed with radial clearance within each of said bores of said first limit stop and said second limit stop; and each end of said first fastening part is disposed to contact said corresponding first limit stop and said second limit stop upon a predetermined maximum radial displacement of said first fastening part with respect to said second fastening part;

said stop means for limiting axial displacement of said first fastening part with respect to said second fastening part comprises:

each of: said first limit stop and said second limit stop comprises a tubular portion;

each of said tubular portions is disposed between said bore and said second fastening part;

each of said tubular portions comprises a length;

the length of each of said tubular portions is disposed to extend in the axial direction;

each of said tubular portions comprises an end surface;

said end surface of said first limit stop being disposed opposite said end surface of said second limit stop;

each of said first limit stop end surface and said second limit stop end surface is disposed with axial clearance from a portion of said resilient element; and each of said first limit stop end surface and said second limit stop end surface is disposed to contact said corresponding resilient element portion upon a predetermined maximum relative axial displacement of said first fastening part in a corresponding axial direction of displacement;

said engine mounting further comprises a plurality of ring elements;

each of said plurality of ring elements is mounted adjacent an inner diameter of said second fastening part cylindrical portion;

at least one of said plurality of ring elements is detachably mounted to said second fastening part;

said resilient element is connected to said at least one detachably mounted ring element for detachably connecting said elastic element to said second fastening part;

said damping channel is disposed within at least one of said plurality of ring elements;

said valve device is disposed within said damping channel;

a portion of said resilient element forms said bellows wall of said equalization chamber;

said second fastening part cylindrical portion comprises said second fastening part flange portion;

said second fastening part flange portion comprises at least one fastening hole;

said at least one fastening hole of said second fastening part is disposed concentrically about a second fastener axis;

the second fastener axis is disposed generally perpendicular to the first fastener axis; and said decoupling device comprises:

a third fluid chamber;

a portion of said first fastening component is disposed about a portion of said third fluid chamber;

a membrane disc;

said membrane disc is disposed between said third fluid chamber and said pump chamber;

said membrane disc is movable for fluid connection between said third fluid chamber and said pump chamber;

sealing means;

said sealing means comprises a bellows;

said bellows comprises a portion of said third fluid chamber;

means for protecting said sealing means; and said protection means comprises a rigid cap.

* * * * *

UNITED STATES PATENT AND TRADEMARK OFFICE
CERTIFICATE OF CORRECTION

PATENT NO. : 5,895,031
DATED : April 20, 1999
INVENTOR(S) : Heinrich MEYER and Peter MAIER It is certified that error appears in the above-indentified patent and that said Letters Patent is hereby corrected as shown below:

In column 2, line 53, after 'FIG. 3,', delete 'the' and insert --but--.

In column 3, line 3, after 'two', delete "chamber," and insert --chambers,--.

In column 6, line 38, after 'axial' insert --relative--.

In column 7, line 8, after 'No.', delete "5,834,350." and insert --4,834,350.--.

In column 7, line 16, after 'readily', delete "appreciated" and insert --appreciate--.

In column 10, line 15, Claim 3, after 'is', delete "movably" and insert --movable--.

Signed and Sealed this

Fifteenth Day of February, 2000

Attest:

Q. TODD DICKINSON

Attesting Officer     Commissioner of Patents and Trademarks